United States Patent Office 3,434,855
Patented Mar. 25, 1969

3,434,855
INORGANIC THERMAL CONTROL PIGMENT
James E. Webb, Administrator of the National Aeronautics and Space Administration, with respect to an invention of George Richard Blair, Culver City, Calif.
No Drawing. Filed Feb. 5, 1965, Ser. No. 430,777
Int. Cl. C09d 1/02, 5/32
U.S. Cl. 106—84  12 Claims

ABSTRACT OF THE DISCLOSURE

A novel heat-treated clay composition produced by heating an impurity-containing aluminum silicate clay having the following general compositions:

| | Wt. percent |
|---|---|
| $SiO_2$ | 42–46 |
| $Al_2O_3$ | 36–40 |
| $Fe_2O_3$ | 1.0–0.1 |
| MgO | <2.0 |
| $TiO_2$ | 0.2–0.8 |
| CaO, $Na_2O$, $K_2O$ (combined) | <1.0 | in the form of a thin layer at a temperature of from about 1175° C. to about 1375° C.; and the ultraviolet light stable paint composition containing said heat-treated clay together with an alkali metal silicate.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457.

This invention relates to a novel white paint, particularly suitable for use on space capsules and to its method of preparation, said paint being characterized by a low solar absorptance and stability to ultraviolet light.

The space capsules which are presently orbited around the earth and proposed for use in interplanetary travel are subjected to intense solar radiation while in space. The radiation impinging on the capsule surface, if not controlled, can render the interior of the capsule unsuitable for astronauts or even for many forms of instrumentation. Therefore, it is essential that the heat absorbed by the capsule in the form of solar radiation be regulated in order that the interior temperature of the capsule be controlled.

Hertofore, it has been proposed to control the extent of solar absorption of the capsule by means of surface coatings having known absorptance and emittance characteristics. For example, areas of black and white have been painted on the capsule surface to give a desired overall absorptance and emittance. The white paints previously used for this purpose are composed of ceramic materials, such as clay and/or titanium oxide, in admixture with an organic binder. By admixture of dark pigments, these paints can be formulated to provide any initial degree of absorptance desired. However, these paints have been found to gradually change color, generally to a light brown or grey, upon prolonged exposure to the intense ultraviolet radiation encountered in space. When this color change occurs, the overall absorptance characteristics of the capsule surface are often drastically altered.

According to the present invention, is has now been found that certain clays, when heat treated in the manner hereinafter fully described, will in admixture with alkali metal silicates form a white paint particularly well suited for the coating of the exterior of space capsules. It has been found that the absorption of these new paints is altered to a far less degree than previously used paints, even after prolonged exposure to ultraviolet light. The emittance is not changed under the same conditions. By the use of these paints it is possible to select any desired overall absorptance characteristic for the capsule. This characteristic will be maintained over the useful life of the capsule.

It is an object of this invention to provide a novel white paint composition.

It is another object of this invention to provide a white paint composition which retains its color under conditions of prolonged exposure to ultraviolet light.

Still another object of this invention is the provision of a white paint composition of essentially constant absorptance and emittance characteristics.

Yet another object of this invention is the provision of a novel heat treated clay composition and a method for the preparation of the same.

These and other objects of this invention will be apparent to those skilled in the art from the more detailed description which follows.

The novel white paint composition of this invention comprises an aqueous solution of from about four to about five parts by weight of a specially heat-treated aluminum silicate clay per one part of an alkali metal silicate, such as sodium silicate, lithium silicate or, preferably, potassium silicate.

The clay used has the following composition prior to heat treatment:

| | Wt. percent |
|---|---|
| $SiO_2$ | 42–46 |
| $Al_2O_3$ | 36–40 |
| $Fe_2O_3$ | 1.0–0.1 |
| MgO | <2.0 |
| $TiO_2$ | 0.2–0.8 |
| CaO, $Na_2O$, $K_2O$ (combined) | <1.0 |

The foregoing analyses are based on the results obtained when the clay is first heated at about 100° C. for several hours to remove surface water and then analyzed for the various elements by standard quantitative procedures, the results being expressed in terms of the oxides in the conventional manner.

The clay is also characterized in that upon ignition at about 1000° C. for about 60 minutes, the material undergoes a weight loss of about 12–16%.

The untreated clay for use in this invention generally has a mole ratio of $SiO_2/Al_2O_3$ of about two, and also contains small trace amounts of other metals including manganese, vanadium and copper.

The heat treatment of the clay involves maintaining the finely divided clay having initial composition within the above ranges in a thin layer less than about one inch in thickness, at a temperature of from about 1175° C. to about 1375° C. For optimum results, the heating is carried out for about 0.5 to about 10 hours in an oxygen-containing atmosphere.

I am not certain which impurities are detrimental to the ultraviolet stability of the resultant paint. However, in the clay heat treating process of this invention I have found that temperatures substantially below about 1175° C. were insufficient to burn off certain impurities which have a deleterious effect upon ultraviolet stability. On the other hand, if the temperature is increased considerably beyond 1375° C., certain normally innocuous retained impurities then tend to flux, thereby generating materials having an undesirable effect upon ultraviolet stability.

The heat treatment process is conveniently carried out in an oven, preferably containing an oxidizing atmosphere such as air or oxygen. The air or oxygen serves to burn away the undesirable impurities dispersed throughout the untreated clay. The clay to be treated should be first spread out in the oven to any desired degree of thinness, but in any event the clay layer should not contain any areas thicker than about one inch. If the clay layer is thicker than about one inch, the impurities in the center of the layer do not have sufficient contact with the oxygen to be burned away. The minimum thickness of the clay layer is limited only by the oven area. Within the prescribed limits it is usually most expedient to make the clay layer as thick as possible in order to increase the effective capacity of the oven.

The heat-treated clay is usually then finely milled and mixed with water. The clay-water mixture is then combined with an aqueous solution of the alkali metal silicate to form an aqueous paint composition containing from about four to about five parts of clay per part of alkali metal silicate, on a dry weight basis. The amount of water in the paint is not critical, but normally is within the range from about 20% to 75% based on the total weight of paint composition.

The resultant paint composition may be readily applied to the surface to be coated, such as the metal surface of a space capsule, by spraying or brushing, using conventional paint applicator equipment.

As the foregoing description indicates, the present invention may take many forms. Therefore, it will be understood that the following examples are presented solely to illustrate the invention and not to limit it. In the examples, the parts and the percentages are by weight unless otherwise indiciated.

EXAMPLE I

Heat treatment of the clay

A finely divided aluminum silicate clay (sold commercially under the name Plasmo clay) is dried at 100° C. and then analyzed and found to have the following composition:

| | Wt. percent |
|---|---|
| $SiO_2$ | 44.50 |
| $Al_2O_3$ | 38.50 |
| $Fe_2O_3$ | 0.70 |
| $MgO$ | 1.28 |
| $TiO_2$ | 0.42 |
| $CaO$ | 0.05 |
| $Na_2O$ | 0.47 |
| $K_2O$ | 0.11 |
| Ignition loss | 13.57 |

The clay is spread on the bottom of an oven. The thickness of the clay layer is about three-quarters of an inch and the oven temperature is maintained at about 1275° C. After maintaining the clay at this temperature for about sixty minutes, the clay is removed from the oven. Then 520 grams of the clay are ball milled with 320 grams of water to form a ceramic slip. This slip is then ready for compounding with the alkali metal silicate to form the paint composition.

EXAMPLE II

Preparation of the paint composition

About 840 parts of the slip prepared according to Example I are mixed with 336 parts of an aqueous 35.2% solution of potassium silicate of about 4.5 to one on a dry weight basis. After thorough blending, the paint composition is pumped through a conventional paint sprayer and onto a metal surface. The resultant coating is extremely hard and tenacious. The absorptance ($\alpha$) of the coating is equal to about 0.17 and the infrared emittance ($\epsilon$) is equal to about 0.93. Test coupons of the coated part are then subjected to ultraviolet light radiation in vacuum for 100 hours at an ultraviolet intensity equal to 10 times that of the sun in space. It is found that the absroptance changes by a minimal amount such as .04 unit and the infrared emittance characteristic is not altered by the ultraviolet exposure.

The absorptance ($\alpha$) is defined as the ratio of energy absorbed by a body to the total energy incident on the body, the energy being in the form of radiation of from 3,000 A. to about 40,000 A.

The emittance ($\epsilon$) is defined as the ratio of energy emitted by a body to the emitted energy of a theoretic black body at the same temperature. The emitted energy, of value to space vehicle thermal control is in the range 15,000 A. to 500,000 A. A more complete theoretical discussion of these ratios may be found in "Basic Studies on the Use and Control of Solar Energy," by D. K. Edwards et al., University of California Report No. 60–93.

Having fully described this invention, it is intended that it be limited only by the lawful scope of the appended claims.

I claim:

1. A heat-treated clay composition produced by heating an impurity-containing aluminum silicate clay having the following general composition:

| | Wt. percent |
|---|---|
| $SiO_2$ | 42–46 |
| $Al_2O_3$ | 36–40 |
| $Fe_2O_3$ | 1.0–0.1 |
| $MgO$ | <2.0 |
| $TiO_2$ | 0.2–0.8 |
| $CaO$, $Na_2O$, $K_2O$ (combined) | <1.0 | in the form of a thin layer at a temperature of from about 1175° C. to about 1375° C.

2. A heat-treated clay composition produced by heating an impurity-containing aluminum silicate clay having the following composition:

| | Wt. percent |
|---|---|
| $SiO_2$ | 44.50 |
| $Al_2O_3$ | 38.50 |
| $Fe_2O_3$ | 0.70 |
| $MgO$ | 1.28 |
| $TiO_2$ | 0.42 |
| $CaO$ | 0.05 |
| $Na_2O$ | 0.47 |
| $K_2O$ | 0.11 | in the form of a thin layer at a temperature of about 1275° C.

3. A heat-treated clay composition produced by heating an impurity-containing aluminum silicate clay having the following general composition:

| | Wt. percent |
|---|---|
| $SiO_2$ | 42–46 |
| $Al_2O_3$ | 36–40 |
| $Fe_2O_3$ | 1.0–0.1 |
| $MgO$ | <2.0 |
| $TiO_2$ | 0.2–0.8 |
| $CaO$, $Na_2O$, $K_2O$ (combined) | <1.0 | in the form of a layer less than about one inch thick at a temperature of from about 1175° C. to about 1375° C. for from about 0.5 to about 10 hours in an oxygen-containing atmosphere.

4. A heat-treated clay composition produced by heating an impurity-containing aluminum silicate clay having the following composition:

| | Wt. percent |
|---|---|
| $SiO_2$ | 44.50 |
| $Al_2O_3$ | 38.50 |
| $Fe_2O_3$ | 0.70 |
| $MgO$ | 1.28 |
| $TiO_2$ | 0.42 |
| $CaO$ | 0.05 |
| $Na_2O$ | 0.47 |
| $K_2O$ | 0.11 | in the form of a thin layer about three-quarters of an inch thick at a temperature of about 1275° C. for about one hour in oxygen-containing atmosphere.

5. The method for the heat treatment of clay which comprises heating an impurity-containing aluminum silicate clay having the following general composition:

| | Wt. percent |
|---|---|
| $SiO_2$ | 42–46 |
| $Al_2O_3$ | 36–40 |
| $Fe_2O_3$ | 1.0–0.1 |
| MgO | <2.0 |
| $TiO_2$ | 0.2–0.8 |
| CaO, $Na_2O$, $K_2O$ (combined) | <1.0 | in the form of a thin layer at a temperature of from about 1175° C. to about 1375° C.

6. The method for the heat treatment of clay which comprises heating an impurity-containing aluminum silicate clay having the following composition:

| | Wt. percent |
|---|---|
| $SiO_2$ | 44.50 |
| $Al_2O_3$ | 38.50 |
| $Fe_2O_3$ | 0.70 |
| MgO | 1.28 |
| $TiO_2$ | 0.42 |
| CaO | 0.05 |
| $Na_2O$ | 0.47 |
| $K_2O$ | 0.11 | in the form of a thin layer at a temperature of about 1275° C.

7. The method for the heat treatment of clay which comprises heating an impurity-containing aluminum silicate clay having the following general composition:

| | Wt. percent |
|---|---|
| $SiO_2$ | 42–46 |
| $Al_2O_3$ | 36–40 |
| $Fe_2O_3$ | 1.0–0.1 |
| MgO | <2.0 |
| $TiO_2$ | 0.2–0.8 |
| CaO, $Na_2O$, $K_2O$ (combined) | <1.0 | in the form of a thin layer less than about one inch thick at a temperature of from about 1175° C. to about 1375° C. for from about 0.5 to about 10 hours in an oxygen-containing atmosphere.

8. The method for the heat treatment of clay which comprises heating an impurity-containing aluminum silicate clay having the following composition:

| | Wt. percent |
|---|---|
| $SiO_2$ | 44.50 |
| $Al_2O_3$ | 38.50 |
| $Fe_2O_3$ | 0.70 |
| MgO | 1.28 |
| $TiO_2$ | 0.42 |
| CaO | 0.05 |
| $Na_2O$ | 0.47 |
| $K_2O$ | 0.11 | in the form of a thin layer about three-quarters of an inch thick at a temperature of about 1275° C. for about one hour, in an oxygen-containing atmosphere.

9. A white ultraviolet light stable paint composition consisting essentially of an aqueous solution containing from about four to about five parts by weight of clay per part of an alkali metal silicate on a dry weight basis, said clay having been prepared by heating an impurity-containing aluminum silicate clay having the following general composition:

| | Wt. percent |
|---|---|
| $SiO_2$ | 42–46 |
| $Al_2O_3$ | 36–40 |
| $Fe_2O_3$ | 1.0–0.1 |
| MgO | <2.0 |
| $TiO_2$ | 0.2–0.8 |
| CaO, $Na_2O$, $K_2O$ (combined) | <1.0 | in the form of a thin layer at a temperature of from about 1175° C. to about 1375° C.

10. A white ultraviolet light stable paint composition consisting essentially of an aqueous solution containing from about four to about five parts by weight of clay per part of an alkali metal silicate on a dry weight basis, said clay having been prepared by heating an impurity-containing aluminum silicate clay having the following general composition:

| | Wt. percent |
|---|---|
| $SiO_2$ | 42–46 |
| $Al_2O_3$ | 36–40 |
| $Fe_2O_3$ | 1.0–0.1 |
| MgO | <2.0 |
| $TiO_2$ | 0.2–0.8 |
| CaO, $Na_2O$, $K_2O$ (combined) | <1.0 | in the form of a thin layer less than about one inch thick at a tempeature of from about 1175° C. to about 1375° C. for from about 0.5 to about 10 hours in an oxygen-containing atmosphere.

11. A white ultraviolet light stable paint composition consisting essentially of an aqueous solution containing about 4.5 parts by weight of clay per one part by weight of potassium silicate on a dry weight basis, said clay having been prepared by heating an impurity-containing aluminum silicate clay having the following composition:

| | Wt. percent |
|---|---|
| $SiO_2$ | 44.50 |
| $Al_2O_3$ | 38.50 |
| $Fe_2O_3$ | 0.70 |
| MgO | 1.28 |
| $TiO_2$ | 0.42 |
| CaO | 0.05 |
| $Na_2O$ | 0.47 |
| $K_2O$ | 0.11 | in the form of a thin layer at a temperature of about 1275° C.

12. A white ultraviolet light stable paint composition consisting essentially of an aqueous solution containing about 4.5 parts by weight of clay per one part by weight of potassium silicate on a dry weight basis, said clay having been prepared by heating an impurity-containing aluminum silicate clay having the following composition:

| | Wt. percent |
|---|---|
| $SiO_2$ | 44.50 |
| $Al_2O_3$ | 38.50 |
| $Fe_2O_3$ | 0.70 |
| MgO | 1.28 |
| $TiO_2$ | 0.42 |
| CaO | 0.05 |
| $Na_2O$ | 0.47 |
| $K_2O$ | 0.11 | in the form of a thin layer about three-quarters of an inch thick at a temperature of about 1275° C. for about one hour in an oxygen-containing atmosphere.

References Cited

UNITED STATES PATENTS

| 2,209,304 | 7/1940 | Alder. |
|---|---|---|
| 2,307,239 | 1/1943 | Rowland. |
| 2,376,163 | 5/1945 | Metzger _____ 106—84 |
| 2,407,615 | 9/1946 | Moon. |
| 2,894,628 | 7/1959 | Duke. |
| 2,998,328 | 8/1961 | Munger et al. |

FOREIGN PATENTS

678,740  9/1952  Great Britain.

JAMES E. POER, *Primary Examiner.*

U.S. Cl. X.R.

106—72, 288